Figure 1:
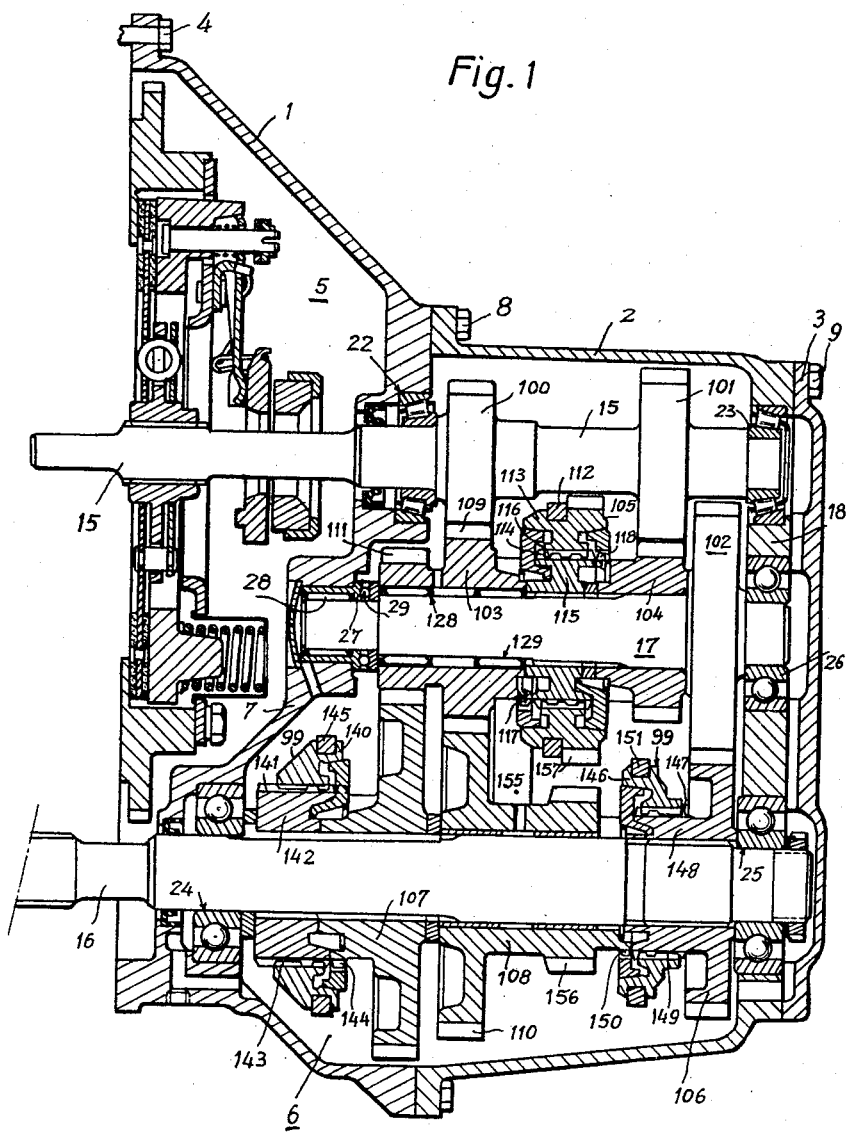

Dec. 29, 1964  L. PÉRAS  3,163,053
TRANSMISSION MECHANISMS, NOTABLY FOR VEHICLES
Filed Jan. 8, 1962  3 Sheets-Sheet 1

Inventor
Lucien Peras
By Stevens Davis Miller & Mosher
Attorneys

Dec. 29, 1964  L. PÉRAS  3,163,053
TRANSMISSION MECHANISMS, NOTABLY FOR VEHICLES
Filed Jan. 8, 1962  3 Sheets-Sheet 3

Inventor
Lucien Péras
By Stevens Davis Miller & Mosher
Attorneys

United States Patent Office 3,163,053
Patented Dec. 29, 1964

3,163,053
TRANSMISSION MECHANISMS, NOTABLY
FOR VEHICLES
Lucien Péras, Billancourt, France, assignor to Regie
Nationale des Usines Renault, Seine, France
Filed Jan. 8, 1962, Ser. No. 164,918
Claims priority, application France, Jan. 20, 1961,
850,361
10 Claims. (Cl. 74—359)

The present invention relates to transmission mechanisms and has specific reference to a gearbox or change-speed mechanism incorporating dog clutches with or without synchronisers, wherein the particular arrangement of the gears and pinions is such that the over-all dimensions are reduced considerably while providing a substantial relative spacing between the axes of the input shaft and output shaft.

In the specific case of an application to a vehicle with this gear and pinion arrangement the output shaft may be disposed on the same side as the input shaft, outside the radial dimension of the clutch usually coupled with the gearbox and also of the engine flywheel, whereby a particularly compact design of the power unit, transmission mechanism and final drive (that is to the rear- or front-axle, depending on whether the vehicle is rear-engined or front-engined) may be obtained and disposed if desired either longitudinally or transversely of the vehicle.

Figure 7:
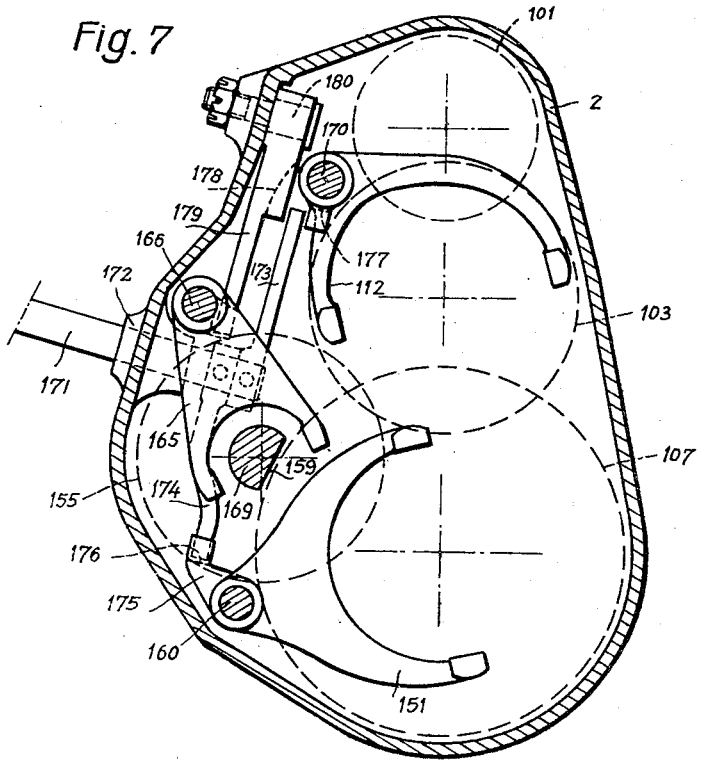
Figure 8:
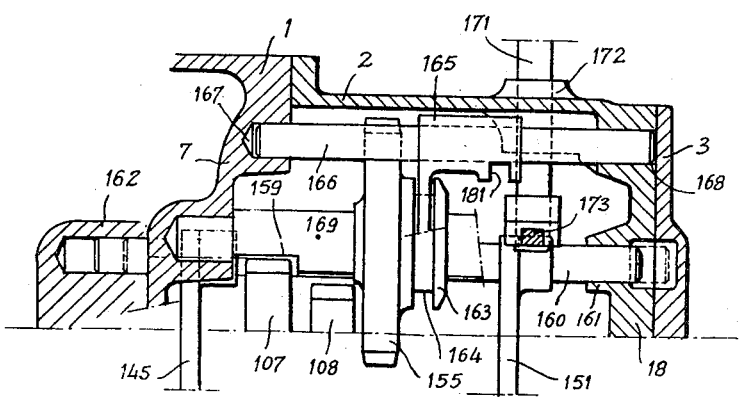

In order to afford a better understanding of the invention and of the manner in which the same may be carried out in practice, reference will now be made to the accompanying drawings illustrating diagrammatically by way of example a typical embodiment thereof. In the drawings:

FIGURE 1 is a vertical axial section showing a clutch and change-speed unit constructed according to the teachings of this invention;

FIGURES 2 to 6 inclusive are diagrammatic, simplified views showing on a smaller scale the unit of FIG. 1 in order better to illustrate the power transmission in each forward speed and reverse from the input shaft to the output shaft;

FIGURE 7 is a vertical section taken across the gear case of the unit shown in FIG. 1, to illustrate a possible arrangement of the forks and of the control means therefor; and FIGURE 8 is a fragmentary horizontal section of the gearbox case illustrated in FIG. 1, to show the relative arrangement of certain elements illustrated in FIG. 7.

Referring firstly to FIG. 1, the clutch and change-speed unit illustrated therein comprises a case consisting of three sections 1, 2 and 3. The case section 1 is fastened to the engine block (not shown) by means of bolts such as 4.

Section 1 comprises an offset, substantially frusto-conical wall or partition 7 which extends through the case so that a vertical section taken through this case section will have substantially the shape of an inverted S in order to provide two recesses 5, 6 facing opposite directions, the upper recess 5 registering with the engine block. The case section 2 constitutes an extension of section 1 and is secured thereto at one end by means of bolts of which two are shown at 8.

The case section 3 is secured on the other end of section 2 by means of bolts such as 9, and constitutes the end flange or cover of section 2.

The clutch and change-speed unit comprises three parallel main shafts disposed in a common plane, that is: an input shaft 15, an output shaft 16 and an intermediate or lay shaft 17; by disposing the three shafts in a common vertical plane, a predetermined relative spacing may be obtained between the input and output shafts. However, it would not constitute a departure from the invention to dispose the intermediate or lay shaft 17 in another plane, although these shafts should always be parallel to each other, for example in order to reduce the distance between centres, if need be.

The input shaft 15 extends through recess 5, wall 7 (in which it is supported by a taper-roller bearing 22) and case section 2, its inner end being supported by another taper-roller bearing 23 housed in a thicker portion 18 of case section 2, as shown.

The output shaft 15 extends through the lower portion of recess 5, wall 7 (in which it is supported by a ball-bearing 24), recess 6 and cases section 2, its rear or inner end being supported by another ball-bearing 25 housed in the lower portion of the thicker wall 18 of case section 2.

The intermediate or lay shaft 17 is disposed between the input and output shafts 15, 16 and extends only through the upper portion of recess 6 and the case section 2; it has one end supported by a ball-bearing 26 housed in the thicker wall 18 of case section 2 and the other end supported by a bearing 27 housed in the wall 7 and comprising needles 28 adapted to support or absorb a radial load applied to shaft 17 and balls 29 for supporting or absorbing an axial load applied to the shaft in the left-hand direction.

The clutch housed in the upper recess 5 is a single-disc friction clutch of known type in this embodiment, but obviously other clutch types may be used without departing from the spirit and scope of the invention.

In the change-speed mechanism the input shaft 15 carries two gear 100, 101 solid therewith, the intermediate shaft 17 carries a gear 102 also rigid therewith and a pair of loosely rotating pinions 103, 104 separated by a synchromesh and dog-clutch device 105, and the output shaft 16 carries a pinion 106 solid therewith and a pair of loosely rotating gears 107, 108 having a synchromesh and dog-clutch device 99 disposed on either side, as shown.

The free-rotating pinion 103 for the third gear or speed comprises a first set of teeth 109 meshing on the one hand with the teeth of the solid gear 100 and on the other hand with a first set of teeth 110 of the free-rotating gear 108 for the second gear or speed. Another set of teeth 111 of the free-rotating pinion 103 is in constant meshing engagement with the teeth of the free-rotating gear 107 for the first or low gear or speed, the teeth 111 of pinion 103 and gear 107 being housed in the recess 6 of case section 1. The teeth of the solid-mounted gear 101 mesh with the teeth of the free-rotating pinion 104 for the fourth or top gear or speed. The teeth of the solid-mounted gear 102 mesh with those of the solid-mounted pinion 106. All these meshing engagements are of the constant type. Since the solid-mounted pinions 102 and 106 are in constant meshing engagement, shafts 16 and 17 rotate in opposite directions and as a function of the vehicle displacement, while all the other pinions revolve as a function of the input shaft 15 and therefore of the engine. All the teeth are preferably of the helical type.

The synchromesh and dog-clutch device 105 constitutes the subject-matter of the patent application Serial Nr. 846,719 of October 15, 1959, in the applicant's name, now Patent No. 3,035,674 issued May 22, 1962. It comprises essentially a sliding ring 113 adapted to slide along splines 114 formed on a hub 115 keyed on the intermediate shaft 17.

When the sliding ring 113 is moved to the left under the control of a fork 112, the inner teeth or dogs 116 of the ring are caused to mesh with corresponding teeth or dogs 117 of pinion 103, so that the latter becomes rotatably rigid with shaft 17. When the sliding ring 113 is moved to the right under the control of the same fork 112, the inner teeth or dogs 116 are caused to mesh with the teeth or dogs 118 of pinion 104 whereby the latter becomes rotatably solid with shaft 17 while pinion 103 remains free.

The synchromesh and dog clutch device 99 is constructed and operates according to the same principles as the device 105. This device 99 is divided into two portions between which the loosely rotating pinions 107 and 108 are disposed. The left-hand portion housed in cavity 6 comprises a sliding ring 140 adapted to slide on splines 141 of a hub 142 keyed on the output shaft 16 whereby the inner teeth 143 of the sliding ring may be brought into meshing engagement with the teeth or dogs 144 of the loosely rotating low-speed pinion 107 when the sliding ring is moved to the right by a fork 145. The right-hand portion comprises another sliding ring 146 adapted to slide on splines 147 of a hub 148 of the solid pinion 106 so that the inner teeth 149 of the sliding ring are caused to mesh with the sliding ring dogs or teeth 150 of the free-rotating second-speed pinion 108 when the sliding ring 146 is moved to the left by a fork 151. The forks 145 and 151 are solid with a common sliding rod. The sliding rings 140 and 146 will thus move bodily, the first-speed sliding ring 140 performing its operative movement to the right and its inoperative movement to the left, while the second-speed sliding ring 146 performs its inoperative movement to the right and its operative movement to the left.

As to the reverse, the change-speed mechanism comprises a sliding ring or spur gear 155 carried by a separate shaft 169. This sliding ring 155 may be moved by means of a fork 165 to a position in which it registers with another set of spur teeth 156 formed on the second-speed loose pinion 108, and with another set of spur teeth 157 formed on the third and fourth speed sliding ring 113, which are co-planar with the aforesaid teeth 156 so that the sliding gear 155 may mesh simultaneously with both sets of teeth 156 and 157.

The reverse sliding gear 155 is the only gear remaining stationary in an inoperative position when the shafts 15 to 17 revolve.

FIGURES 2 to 6 inclusive illustrate the change-speed mechanism in the different positions obtaining in first (or low) speed, second speed, third speed and fourth (or top) speed, and in reverse.

Figure 2:
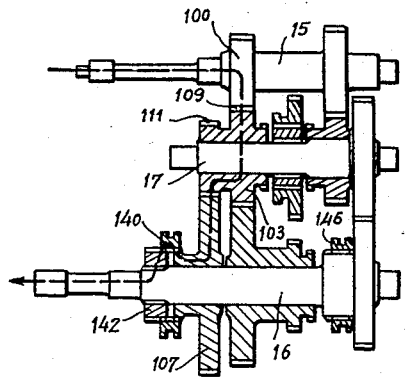

FIG. 2 shows the transmission mechanism in the first-speed position. In this figure the sliding rings 140 and 146 have been moved to the right. As a consequence of this movement, the first-speed gear 107 revolves bodily with the output shaft 16 through the sliding ring 140, the other sliding ring 146 remaining inoperative after this movement.

The power is transmitted through input shaft 15, the fast gear 100, the set of teeth 109 of third-speed gear 103, the set of teeth 111 of the same gear, gear 107, sliding ring 140, hub 142 to the output shaft 16.

Figure 3:
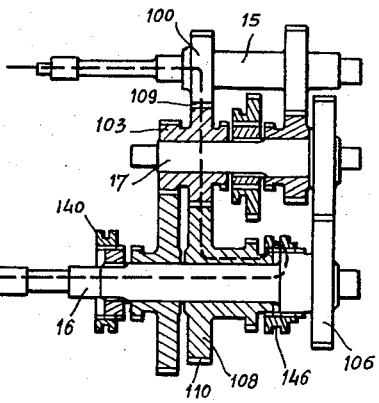

FIG. 3 illustrates the transmission obtained in second speed. In this figure, the sliding rings 140 and 146 are shown after completion of their stroke to the left from neutral, thus causing the second-speed gear 108 solid with output shaft 16.

The power is thus transmitted from shaft 15 through the fast gear 100, then directly through the set of teeth 109 of pinion 103 to the set of the teeth 110 of pinion 108, the sliding ring 146, the fast pinion 106 to the output shaft 16.

By using helical gears a reaction torque is produced between the teeth 109 and pinion 103, but the latter is properly seated on shaft 17 as its axial length is extended by the presence of the second set of teeth 111 for the second speed. This extended length also permits pinion 103 to be supported on shaft 17 by means of two needle bearings 128 and 129.

Therefore, the second-speed ratio is determined by the ratio of the number of teeth of gear 100 to that of pinion 108; thus, the establishment of this ratio constitutes the starting point for determining all the geometrical factors of the assembly.

Figure 4:
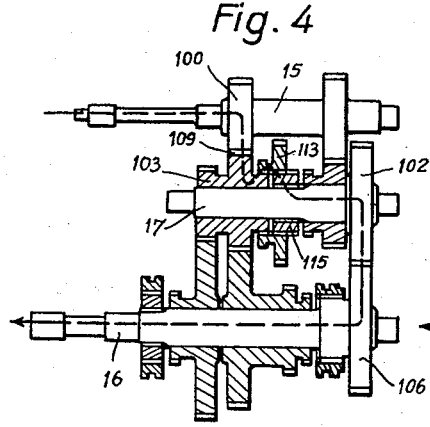

FIG. 4 illustrates the power transmission providing the third speed. In this figure the sliding rings 140 and 146 are left in or restored to their neutral positions and the sliding ring 113 of synchronizer 105 for the third and fourth speeds are moved to the left. The loosely rotating pinion 103 with its two sets of teeth 109 and 111 is thus caused to rotate bodily with the intermediate or lay shaft 17 extending therethrough.

The power is thus transmitted from the input shaft 15 through the fast gear 100, the set of teeth 109 of pinion 103 rotatably driving through the sliding ring 113 and its fast hub 115 the intermediate shaft 17 driving in turn through the pair of fast pinions 103 and 106 the output shaft 16.

Figure 5:
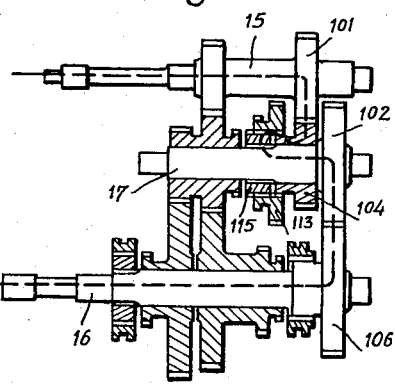

FIG. 5 illustrates the transmission of power in the fourth speed position. In this figure the sliding ring 113 has been moved to the right from its neutral position, thus causing the fourth speed pinion 104 to revolve bodily with the intermediate shaft 17. The pinion 103 with its two sets of teeth is released and revolves freely about the shaft 17 as well as pinions 107 and 108 of the first and second speeds on the output shaft 16.

The engine power is thus transmitted from shaft 15 through the fast gear 101, then through pinion 104; sliding ring 113, the fast hub 115 thereof, intermediate shaft 17, fast gear 102 and pinion 106, to the output shaft 16.

Figure 6:
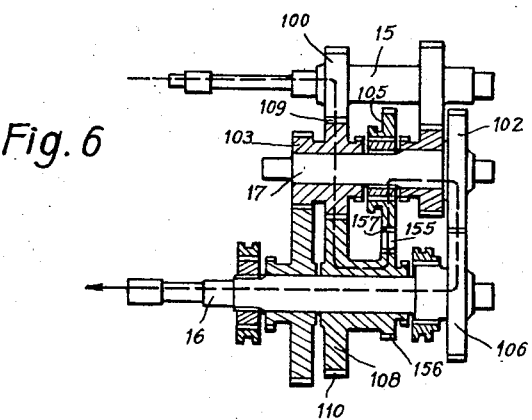

Finally, FIG. 6 illustrates the transmission of power in reverse. In this figure the sliding rings 140 and 146 for the first and second speeds are in their neutral positions as well as the sliding ring 113 of the third and fourth speeds; it is the reverse sliding ring 155 that is brought in meshing engagement with the teeth 156 of pinion 108 and teeth 157 of the sliding ring 113.

The power from input shaft 15 is transmitted again through the fast gear 100 and then without consequence through teeth 109 of the free rotating pinion 103, before passing through the teeth of pinion 108 revolving freely on the output shaft 16, the teeth 156 of this pinion, the sliding pinion 156, the synchromesh and dog-clutch device 105, the intermediate shaft 17 on which the device 105 is rigidly mounted, the fast gear 102 and pinion 106, to the output shaft 16.

The meshing engagement between the sliding pinion 155 and teeth 156 and 157 reverses the direction of rotation of the intermediate shaft 17 driving the output shaft 16 through the couple of gears 102, 106 in a direction opposite to that obtaining in forward drive.

The different transmission ratios are functionally independent of one another as in conventional transmission mechanisms, and they are tributary of one another only through the common distance between centres or through the limits set up by the desired over-all dimensions. Besides, the gear ratios generally used are particularly adequate for the geometrical arrangement of the transmission described hereinabove.

In FIG. 7, the case section 2 is shown in vertical section in order to illustrate diagrammatically a possible arrangement of the sliding ring forks and of their control means. FIGURE 8 illustrates diagrammatically in fragmentary horizontal section taken across the case the relative arrangement of certain component elements shown in FIG. 7.

The forks 145 and 151 of the synchronizing and dog-clutch device 99 are rigidly mounted on a common rod 160 slidably mounted in turn in a pair of end bearings 161 and 162, the first bearing 161 being formed in the aforesaid thicker end wall 18 of case section 2, the other bearing 162 being formed in a thicker portion of the S-shaped partition 7 of case section 1, in the bottom of recess 6 thereof.

The reverse sliding ring 155 is formed with an extended hub 163 comprising a circular groove 164 in which fork 165 is disposed which is slidably mounted on a rod 166 having one end mounted in a bore 167 formed in partition 7 and the other end mounted in a bore 168 formed in wall 18, pinion 155 being also mounted for loose rotation and axial sliding movement on its shaft 169 secured at both ends in bores formed in the aforesaid walls 7 and 18. A flat-bottomed notch 159 is formed in the shaft 169 to permit the passage of the first-speed pinion 107.

The fork 112 associated with the synchronizer and dog-clutch device 105 is slidably mounted on an arbor 170 having similarly its ends mounted in walls 7 and 18.

The movements of these forks are obtained by means of a control device comprising a rod 171 responsive for example to a gear lever (not shown) actuated manually or otherwise, which is adapted to be selectively displaced to and from three axial positions (see FIG. 8) and also angularly. The first axial position is the intermediate position in which the first and second speeds may be engaged. The second axial position is the extreme right position in FIG. 7, that is, the position in which the rod 171 is pushed home into the case, from which it emerges at 172. In this second position the third and fourth speeds may be engaged, the third position being the extreme left-hand position in FIG. 7, wherein the rod 171 has its maximum emergence from the case. In this third position, the reverse may be engaged.

Secured on the inner end of rod 171 are a pair of studs 173 and 174. When the rod 171 is moved from neutral to its first position, the downwardly directed stud 174 engages a notch 176 formed in an arm 175 solid with fork 151. By moving the stud 174 angularly toward the cover 3 the coupled forks 145 and 151 as well as the rod 160 on which these forks are secured are moved similarly toward the cover 3, thus displacing the sliding rings 140 and 146 of the synchronizing and dog-clutch device 99 and causing the engagement of the first or low speed. A reverse angular movement of stud 174 will cause the engagement of the second speed.

When the rod 171 is moved from neutral to its second position as defined hereinabove the stud 174 is disengaged from notch 176 but on the other hand and at the same time the other stud 173 extending upwardly in the case engages another notch 177 formed in the hub of fork 112. When an angular movement is impressed on stud 113 in the direction of the engine, fork 112 slides along rod 170 in the same direction, thus carrying along the sliding ring 113 of the synchronising and dog-clutch device 105 and engaging the third speed. An angular movement of stud 173 in the opposite direction will cause the fourth speed to be engaged.

When the rod 171 is moved in neutral from second to third position, stud 174 passes through notch 176 without any consequence, and stud 173 is released from notch 177 of fork 112 to engage another notch 178 formed in an arm 179 adapted to oscillate freely on a pin 180 secured in the case of section 2. The free end of this arm 179 is directed downwardly and engages permanently a notch 181 (see FIG. 8) formed in a sleeve portion of fork 165. Thus, when the stud 173 describes a circular path in the direction of cover 3, the arm 179 is pivoted in the same direction and carries along the fork 165 and the sliding pinion 155 which are a sliding fit on their respective arbors, so that the reverse is engaged.

In FIG. 7, the rod 171 is shown in its first position. It will be noted that in this position stud 173 lies intermediate the notches 177 and 178, so that it will not effect a useful or operative stroke during the angular movement accomplished by rod 171 in this position.

By providing two diametrally opposite studs 173 and 174 the speed changes take place in the upward or downward direction stepwise, without reversing the movement of the control handle or like control lever (not shown) when the latter is in its neutral position.

Of course, the dog-clutch and synchronising devices 99 and 105 the clutch proper and the fork control devices are illustrated by way of example only, as other devices of this character may be utilized in the transmission mechanism of this invention without departing from the basic principles of the invention as set forth in the appended claims.

I claim:

1. A change-speed mechanism providing four forward speeds and reverse, which comprises an input shaft, an output shaft parallelly disposed in relation to said input shaft, an intermediate shaft, parallel to said input and output shafts, two gears solid with said input shaft, a first-speed pinion and a second-speed pinion rotating freely and juxtaposed on said output shaft, a first and a second synchronizing device, disposed on either side of said first-speed and second speed pinions respectively and adapted selectively to lock either of these two pinions on said output shaft, another pinion solid with said output shaft, another gear fast with said intermediate shaft and in meshing engagement with said other pinion, a third-speed pinion having two parallel sets of teeth and a fourth-speed pinion both mounted for free rotation on said intermediate shaft, one of the two sets of teeth of said third-speed pinion being in meshing engagement with said first-speed free-rotating pinion, the other set of teeth meshing on the one hand with one of said gears fast with said input shaft and on the other hand with said second-speed free-rotating pinion, said fourth-speed free rotating pinion meshing with the other gear fast with said input shaft, another synchronizing device disposed between said third and fourth-speed pinions for selectively locking either of said last-named pinions with said intermediate shaft, a reverse sliding pinion mounted on a separate arbor and adapted to be brought into meshing engagement both with a set of teeth of said synchronizing device of said intermediate shaft and with another set of teeth of said second-speed pinion, and a fork-type control device operatively connected to and for actuating said synchronizing devices and said reverse sliding pinion, to obtain four forward speeds and one reverse drive.

2. A change-speed mechanism for four forward speeds and one reverse drive comprising an input shaft, an intermediate shaft and an output shaft, all being disposed in parallel, the input shaft carrying, mounted solid for rotation therewith, first and second input gears, the intermediate shaft carrying first and second intermediate shaft pinions solid with one another but mounted for free rotation on said intermediate shaft, the second intermediate shaft pinion being permanently meshed with the first input gear, a gear member solid for rotation with said intermediate shaft, a third intermediate shaft pinion mounted for free rotation on said intermediate shaft and being permanently meshed with the second input gear, and a fourth intermediate shaft pinion, solid for rotation on said intermediate shaft, the output shaft carrying a first freely rotating output shaft pinion permanently meshed with the first intermediate shaft pinion, a second as well as third output shaft pinion solid with one another but mounted for free rotation on the output shaft, and a fourth output shaft pinion solid for rotation with the output shaft and being permanently meshed with the fourth intermediate shaft pinion, while the second output shaft pinion is permanently meshed with the second intermediate shaft pinion, two driving groups of dog arrangements being provided, the first group of dog arrangements being mounted on the intermediate shaft, means operatively connected to said first group of dog arrangements so as to permit rendering the intermediate shaft selectively engaged with the first and second intermediate shaft pinions for establishing the third speed ratio and with the third intermediate shaft pinion for establishing the fourth speed ratio, the second group of dog arrangements being mounted on the output shaft, a common means operatively connected to said second group of dog arrangements so as to permit rendering the same selectively engaged with the first output shaft pinion for establishing the first speed ratio and with the second and third output shaft pinions for establishing the second speed ratio, the change-speed mechanism additionally comprising a reverse pinion for transmission in reverse gear, said reverse pinion being mounted on an independent shaft and means operatively connected to said reverse pinion so that same can mesh at the same time with the gear member and the third output shaft pinion for establishing the reverse speed ratio.

3. A change-speed mechanism according to claim 2 in which the driving groups of dog arrangements are provided with a first and a second synchronizing device including dog-clutching elements so that the rotational speeds of the elements of said driving groups of dog arrangements that are capable of being coupled with one another by dog-clutching become equalized before said coupling through said dog-clutching elements, said means comprising a fork-like control device operatively connected to said driving groups of dog arrangements as well as the reverse pinion so as to actuate same.

4. A change-speed mechanism according to claim 2 further comprising a casing divided by a first transverse wall into a first and second compartment, the latter being located between the first and a second transverse wall, the first compartment containing a clutch device and the second compartment containing said pinions and driving groups of dog arrangements, the input shaft traversing the first compartment, the first transverse wall and the second compartment and carrying a friction disc of the clutch, the intermediate shaft being mounted in the second compartment while the output shaft traverses said first transverse wall and the second compartment.

5. A change-speed mechanism according to claim 2 further comprising a casing divided by a first transverse wall into a first and second compartment, the latter being located between the first and a second transverse wall, the first compartment containing a clutch device and the second compartment containing said pinions and driving groups of dog arrangements, the input shaft traversing the first compartment, the first transverse wall and the second compartment and carrying a friction disc of the clutch, the intermediate shaft being mounted in the second compartment while the output shaft traverses said second transverse wall and the second compartment.

6. A change-speed mechanism according to claim 2 wherein said second group of dog arrangements comprises two substantially similar positive dog-clutch elements controlled by a common means, said elements being movable from a central position in which both of said first and third output shaft pinions are loose, to a clutching position in which said first output pinion is clutched to said output shaft, said positive dog-clutch elements being disposed on both sides of a pinion group formed by the first, second and third output shaft pinions.

7. A change-speed mechanism for at least four forward speeds and a reverse drive comprising a casing, an input shaft, an intermediate shaft, an output shaft, said shafts being disposed in said casing in spaced and parallel relationship, said input shaft having disposed thereon and fixed thereto first and second pinions which are spaced from each other, said intermediate shaft having disposed thereon first and second intermediate pinions rotating freely thereon, a gear member and a third pinion fixed to said intermediate shaft, a first synchromesh and a dog-clutch device disposed on said intermediate shaft and being interposed between said intermediate pinions, said first synchromesh and dog-clutch device comprising a positive clutch element having a set of gear teeth, rotatable with said intermediate shaft and movable from a central position in which both of said intermediate pinions are loose, to either of two clutching positions in which one or the other of said intermediate pinions is clutched to said intermediate shaft, said first intermediate pinion having a first set of teeth and a second set of teeth, said first set of teeth meshing with said first gear on said input shaft, said second gear of said input shaft meshing with said second intermediate pinion, said output shaft having disposed thereon a first and second output pinion freely rotatable thereon, said second output pinion having a first set of teeth and a second set of teeth, a third output pinion disposed on said output shaft and rotatable therewith, a second synchromesh and dog-clutch device disposed on said output shaft and being adjacent said first output pinion, a third synchromesh and dog-clutch device disposed on said output shaft and being interposed between said second and third output pinions, said second and third synchromesh and dog-clutch devices comprising each a positive clutch element rotatable with said output shaft and movable from a position in which said first and second output pinions are loose, to a clutching position in which said first output pinion is clutched to said output shaft, said first output pinion meshing with the second teeth of said first intermediate pinion, said first set of teeth of said second output pinion meshing with the first teeth of said first intermediate pinion, said third output pinion meshing with said third intermediate pinion, a pinion shaft disposed parallel to said shafts, a reverse pinion freely rotatable on said pinion shaft as well as being slidable thereon to engage said set of gear teeth of the positive clutch element of said first synchromesh and dog-clutch device and said second set of teeth of said second output pinion, and means operatively engaging said synchronizing devices and reverse pinion to move same into operative positions to obtain four forward speeds and one reverse drive.

8. A change-speed mechanism according to claim 7 in which said third synchronizing device is mounted on said third output pinion.

9. A change speed mechanism according to claim 6 in which said second output pinion, rather than said first output pinion, is clutched to said output shaft.

10. A change speed mechanism according to claim 7 in which said second output pinion, rather than said first output pinion, is clutched to said output shaft.

References Cited by the Examiner
UNITED STATES PATENTS 2,134,109  10/38  Eckert _____ 74—359
2,572,480  10/51  Hoffman _____ 74—359

DON A. WAITE, *Primary Examiner.*

BROUGHTON G. DURHAM, *Examiner.*